June 14, 1960
M. FRANÇOIS
2,940,580
DEVICE FOR LOADING A LETTER OR OTHER DOCUMENT
IN A MOVING CUP OR OTHER COMPARTMENT
Filed June 10, 1959
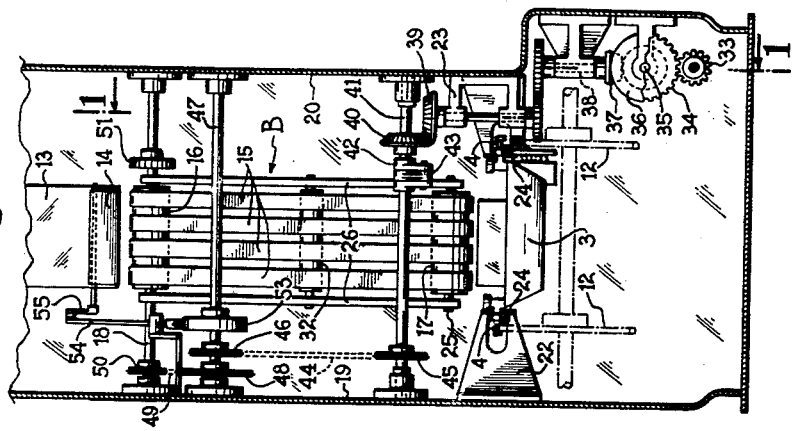
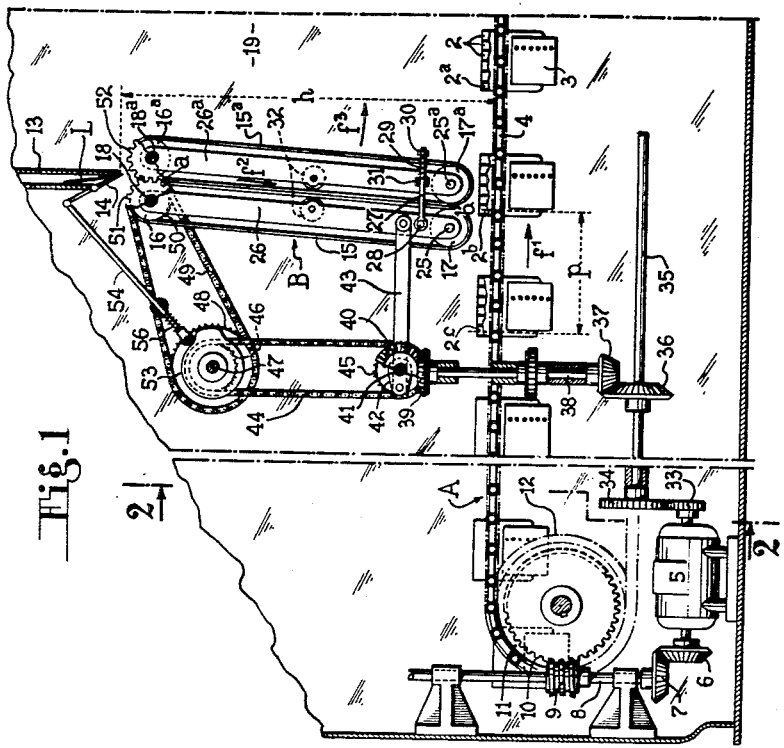

United States Patent Office 2,940,580
Patented June 14, 1960

2,940,580
DEVICE FOR LOADING A LETTER OR OTHER DOCUMENT IN A MOVING CUP OR OTHER COMPARTMENT

Marcel François, Chatenay-Malabry, France, assignor to Hotchkiss-Brandt, Paris, France, a corporation of France Filed June 10, 1959, Ser. No. 819,329

Claims priority, application France June 13, 1958

8 Claims. (Cl. 198—26)

The object of the present invention is to provide an improved simple device which permits, under excellent conditions, loading a letter or like document in a conveying compartment or cup undergoing a uniform and continuous movement of translation.

The device of the invention comprises in combination: a fixed vertical hopper having at its base a closing flap adapted, when in its operative closing position, to maintain in said hopper the document to be loaded, a conveyor pivotably mounted in the vicinity of a first end of the conveyor adjacent the hopper, the second end of the conveyor being in the vicinity of the path of movement of the receiving compartment, and a control mechanism for actuating the flap and pivoting the conveyor in such manner that said second end accompanies the compartment in the motion of the latter while it delivers the document to the compartment, the document being previously released by the opening of the flap.

In this way, the document is perfectly accompanied until it is completely engaged in the compartment for which it is intended. There is no risk of the document falling outside or missing the compartment or of being damaged by an incorrect or insufficient engagement in the compartment.

Further features and advantages of the invention will be apparent from the ensuing description with reference to the accompanying drawing to which the invention is in no way limited.

In the drawing:

Fig. 1 is a front elevational view of a loading device according to the invention, and Fig. 2 is a vertical sectional view taken along line II—II of Fig. 1.

In the illustrated embodiment, the invention is applied to the individual loading of letters L (or other documents) into cups 2 constituting conveying compartments. These cups are assembled in groups, for example there are six cups per group, on carriages 3 connected to two endless twin conveyor chains 4 to which there is imparted a uniform continuous movement by a motor 5 which drives the chains through the medium of a transmission 6–11 and a set of toothed wheels or sprockets 12.

These chains are adapted to move the cups under the loading stations, one of which is partially shown in the figures, and thereafter convey the loaded documents to an unloading station where the bottom of each cup 2 is opened to release the document, if it has received one.

The conveyor A thus constructed could notably be part of a sorting out machine, in which case each cup is indexed, in the known manner, at the loading station as a function of the loaded document, for example in accordance with its address in the case of a letter, the document being thereafter released at a given point or unloading station, this point being a function of the indexing received by the cup.

The various cups 2 of each carriage 3 pertain to different loading stations, and the cups of successive carriages pertaining to the same loading station occupy the same row in all the carriages.

Let it be assumed that the chain moves in the direction of arrow $f^1$ (Fig. 1) and that the first cups $2^a 2^b 2^c \ldots$ on the left are destined for the illustrated loading station. The distance $p$ between two homologue cups will be termed the pitch; each cup travels through the distance corresponding to this pitch in a given time T.

In each loading station, at a sufficient distance $h$ above the upper portion of the chains 4, there is disposed a fixed vertical hopper 13 which receives the letters L which are to be loaded one by one. This hopper is closed at its lower end by a closing flap 14.

Disposed below this hopper, between the latter and the conveyor A, is an auxiliary conveyor B which comprises two sets of endless conveyors 15 and $15^a$ carried by rollers 16, 17 and $16^a$, $17^a$. The shafts 18, $18^a$ of the upper rollers adjacent the hopper 13 are carried by two vertical walls 19, 20 which constitute a passageway and carry supports 22, 23 for rails 24 along which the carriages 3 roll.

The lower rollers 17, $17^a$ have their shafts 25 and $25^a$ carried by twin arms 26 or $26^a$ pivotably mounted on the upper shafts 18 and $18^a$ so that the assembly of the auxiliary conveyor B is capable of pivoting about these upper shafts, that is, about an axis in the immediate vicinity of the hopper 13.

The lower rollers 17, $17^a$ are disposed just above the conveyor A.

The two sets of belts 15 and $15^a$ are pressed against each other along their adjacent portions by an elastic return device which interconnects at least one of the pairs of twin arms 26, $26^a$. This device comprises, for example, a rod 27 which is pivoted at 28 to one of the arms 26 and on which is mounted a spring 29 one end of which bears against the end 31 of the rod, whereas the other end bears against a lug 31 which is fixed to the other arm $26^a$ and through which the rod is freely slidable.

The adjacent portions of the two sets of belts are pressed against one another at at least one point intermediate their length by a set of rollers 32 carried by the arms 26, $26^a$.

This assembly is completed by a control mechanism synchronized with the driving device driving the conveyor A.

The shaft of the motor 5 drives, through a gear transmission 33, 34 a shaft 35 which drives, through two bevel gears 36, 37, a vertical shaft 38. The latter drives, through two bevel gears 39, 40, a horizontal shaft 41 journalled in the walls 19, 20. The shaft 41 carries a crank 42 which is so connected by a connecting rod 43 to one of the arms 26 as to be capable of pivoting the conveyor B.

Further, the shaft 41 is connected, by a chain drive 44 and toothed wheels or sprockets 45 and 46, to another horizontal shaft 47 journalled in the walls 19, 20.

A toothed wheel or sprocket 48 is keyed on the shaft 47 and drives, through a chain 49 and sprocket 50, the shaft 18, the roller 16 and the belts 15. The shaft 18 drives, through gears 51, 52, the other shaft $18^a$ and the roller $16^a$ and the belts $15^a$ in the opposite direction of the belts 15 so that the two adjacent portions of the two pairs of belts move in the direction of the arrow $f^2$ from the upper point $a$ to the lower point $b$ of the conveyor B.

A cam 53 is also keyed on the shaft 47 and is adapted to cause, through the medium of the rod 54 and the crank 55, the flap 14 of the hopper 13 to open or withdraw in opposition to the action of a closing spring 56.

This control mechanism is so arranged, that the drive ratios and the setting of the cam 53 are such that the flap 14 of the hopper 13 is opened to release a letter L (or other document) at an instant $t^0$ preceding the instant $t^1$ at which the cup, such as the cup $2^b$ of one of the carriages 3 pertaining to the considered loading station, passes under the discharge point $b$ of the conveyor B, considered to be in its illustrated extreme left position. The duration ($t^1-t^0$) corresponds to the time required for the two contacting portions of the belts 15 and $15^a$ to travel through the distance $ab$. The swinging of the conveyor B in the direction of arrow $f^3$ commences at instant $t^1$. This swinging is accomplished within a period of time $T'$ which is no more than $T/2$, T being, it will be recalled, the time required by the cup to travel through a distance corresponding to the pitch $p$. The sinusoidal speed of the end $b$ of the conveyor B is such that its mean value is about equal to the constant speed of the conveyor A and cups.

Under these conditions, the flap 14 is opened at the instant $t^0$ and the letter L, if the hopper contains one, slips in between the two sets of belts of the conveyor B at $a$. It reaches the point $b$ at instant $t^1$ and the cup for which the letter is intended arrives in line with the point $b$; the letter enters the cup during a lapse of time $T' \leqslant T/2$ during which the conveyor B swings in the direction of arrow $f^3$ and accompanies the cup with sufficient approximation to ensure that the letter is properly and completely engaged in the cup before the conveyor B starts to swing in the opposite direction.

Although a specific embodiment of the invention has been described, many modifications and changes may be made therein without departing from the scope of the invention as defined in the appended claims.

The device controlling the swinging movement of the conveyor B could be a device having a rapid return, or a cam, so that the time pertaining to the introduction of a letter in its cup could be greater than $T/2$.

The ends of the conveyor B are necessarily so situated that one is under the flap 14 and the other above the cups, but it is not essential that this conveyor have a vertical mean position. It could be horizontal or inclined, the belts being then tangent in a vertical plane and swinging about axes parallel with this plane.

Having now described my invention what I claim as new and desire to secure by Letters Patent is:

1. Device for loading a document, such as a letter, in a receiving conveying compartment to which is imparted a uniform and continuous movement of translation in a given path, said device comprising in combination: a vertical fixed hopper, a closing flap disposed at the base of the hopper and adapted, when it is in its operative closing position, to maintain said document in the hopper, a conveyor located under the hopper and the flap and pivotably mounted in the vicinity of a first end of the conveyor adjacent the hopper the second end of the conveyor being in the vicinity of said path of movement of the compartment, and a control mechanism for actuating the flap and pivoting the conveyor in such manner that said second end of the conveyor accompanies the compartment in its movement while the conveyor delivers the document to the compartment after the document has been previously released from the hopper by the opening of the flap and has passed into the conveyor under the effect of gravity.

2. Device for loading a document, such as a letter, in a receiving conveying compartment to which is imparted a uniform and continuous movement of translation in a given path, said device comprising in combination: a vertical fixed hopper; a closing flap disposed at the base of the hopper and adapted, when the flap is in its operative closing position, to maintain said document in the hopper; a pivotable conveyor disposed under the hopper and the flap and comprising two endless belts which are in contact with each other along adjacent portions of the belts, and, provided for each belt, two rollers, two parallel shafts on which the rollers are rotatably mounted, and two arms interconnecting the two shafts, one of the shafts being fixed and located in the vicinity of the hopper whereas the other shaft is in the vicinity of said path and is carried by the arms so as to pivot with the latter and the conveyor about said fixed shaft, whereby the conveyor is capable of pivoting in the vicinity of the hopper the other end of the conveyor being in the vicinity of and moving along said path; and a control mechanism for actuating the flap and pivoting the conveyor in such manner that said other end of the conveyor accompanies the compartment in the movement of the latter along said path while the conveyor delivers to the compartment the document which has been previously released from the hopper by the opening of the flap and has passed under the effect of gravity between the two adjacent portions of the two belts.

3. Device as claimed in claim 2, comprising elastic means for urging the two adjacent portions of the belts toward one another, so that in the course of their longitudinal movement during the pivoting of the conveyor said portions of the belts convey the document therebetween without slip.

4. Device for loading a document, such as a letter, in a receiving conveying compartment to which is imparted a uniform continuous movement of translation in a given path, said device comprising in combination: a fixed vertical hopper; a closing flap disposed at the base of the hopper and adapted, when it is in its operative closing position, to maintain said document in the hopper; a pivotable conveyor disposed under the hopper and the flap and comprising two sets of endless deformable elements which are in contact with each other by adjacent portions thereof, and, provided for the elements of each set of elements, two rollers, two parallel shafts on which the rollers are rotatable and two arms interconnecting the two shafts, one of the shafts being fixed and in the vicinity of the hopper, whereas the other is in the vicinity of said path and is carried by the arms so as to be pivotable with the latter and the set of elements about said fixed shaft, whereby the conveyor is pivotable about the fixed shaft in the vicinity of the hopper, whereas the other end of the conveyor is in the vicinity of and moves along said path; a control mechanism for actuating the flap and for pivoting the conveyor in such manner that said other end of the conveyor accompanies the compartment in the movement of the latter along said path while the conveyor delivers to the compartment the document which is previously released from the hopper by the refraction of the flap to its open position and descends under the effect of gravity between the adjacent portions of the two sets of elements; and elastic means for urging the adjacent portions of the belts of the two sets of elements toward one another.

5. Device for loading a document, such as a letter, in a receiving conveying compartment to which is imparted a uniform and continuous movement of translation in a given path, said device comprising in combination: a vertical fixed hopper; a closing flap disposed at the base of the hopper and adapted, when the flap is in its operative closing position, to maintain said document in the hopper; a pivotable conveyor disposed under the hopper and the flap and comprising two endless belts which are in contact with each other along adjacent portions of the belts, and, provided for each belt, two rollers, two parallel shafts on which the rollers are rotatably mounted, and two arms interconnecting the two shafts, one of the shafts being fixed and located in the vicinity of the hopper whereas the other is in the vicinity of said path and is carried by the arms so as to pivot with the latter and the conveyor about said fixed shaft, whereby the conveyor is capable of pivoting in the vicinity of the hopper, the other end of the conveyor being in the vicinity of and moving along said path; and a control mechanism which comprises a single driving shaft, a first device for pivoting the flap and delivering the document to the conveyor between the two rollers carried by the fixed shafts, a second device for driving the belts with a continuous movement to feed the document with the contacting portions of the belts from the rollers carried by the fixed shafts to the rollers carried by the movable shafts so as to deliver the document to a compartment, by way of the movable rollers, and a third device for pivoting the arms, the movable rollers and the belts about the fixed shafts, so that the movable rollers accompany the compartment in its movement in said path while they deliver said document to the compartment.

6. Device as claimed in claim 5, wherein the first device for pivoting the flap comprises an actuating cam for actuating the flap, whereas the third device is of the crank and connecting rod type.

7. In an apparatus for conveying documents, such as letters: an endless conveyor provided with receiving compartments each of which latter is adapted to receive a document, a driving device for driving the conveyor in such manner that each compartment undergoes a uniform and continuous movement of translation in a given path, and a device for loading the documents one by one in the compartments, each compartment receiving one document, said device comprising a vertical fixed hopper, a closing flap disposed at the base of the hopper and adapted, when it is in its operative closing position, to maintain said document in the hopper, a conveyor located under the hopper and the flap and pivotably mounted in the vicinity of a first end of the conveyor adjacent the hopper the second end of the conveyor being in the vicinity of said path of movement of the compartment, and a control mechanism for actuating the flap and pivoting the conveyor in such manner that said second end of the conveyor accompanies the compartment in its movement while the conveyor delivers the document to the compartment after the document has been previously released from the hopper by the opening of the flap and has passed into the conveyor under the effect of gravity.

8. In an apparatus for conveying documents, such as letters, in combination: on the one hand, an endless conveyor comprising at least one endless chain, carriages carried by the chain, each carriage having a plurality of cups each of which constitutes a compartment, the distance between two homologue cups of two successive carriages corresponding to the constant pitch of the chain, and a driving device for driving the chain in such manner that each compartment undergoes a uniform and continuous movement of translation, and, on the other hand, a loading device for loading the documents one by one in the compartments, each compartment receiving one document, the loading device comprising, located above the chain: a vertical fixed hopper, a closing flap disposed at the base of the hopper and adapted, when it is in its operative closing position, to maintain in the hopper the document to be loaded, a second conveyor disposed under the hopper and the flap and pivotably mounted in the vicinity of the end of the second conveyor which is adjacent the hopper, the other end of the second conveyor being in the vicinity of the chain carrying the carriages, and a control mechanism connected, on the one hand, to the driving device and, on the other hand, to the flap and the second conveyor whereby the flap is retracted to its open position before a compartment comes in line with the adjacent end of the second conveyor, the document released by the flap onto the second conveyor reaches under the action of the second conveyor said other end of the latter at the moment when the cup passes substantially in line with said other end, and the second conveyor accompanies the cup in the movement of the latter during a fraction of the pitch of the chain sufficient to allow the document to be completely introduced into the cup.

References Cited in the file of this patent

UNITED STATES PATENTS 2,269,532    Howard  ---------------- Jan. 13, 1942